March 12, 1940.   R. G. FERRIS   2,192,904
METHOD OF MAKING PIPE CONNECTIONS
Filed March 29, 1938   2 Sheets-Sheet 1
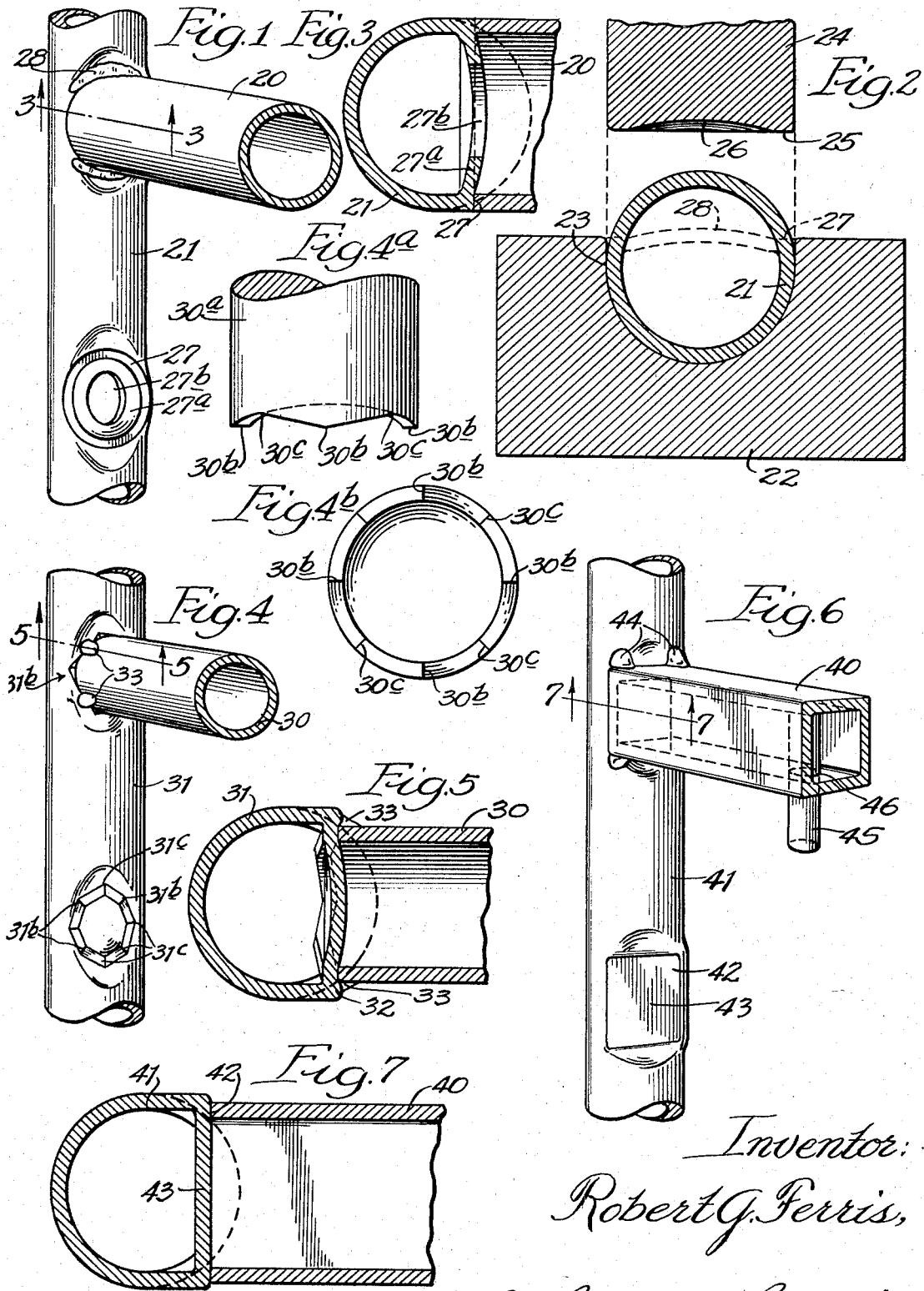

March 12, 1940. R. G. FERRIS 2,192,904
METHOD OF MAKING PIPE CONNECTIONS
Filed March 29, 1938 2 Sheets-Sheet 2
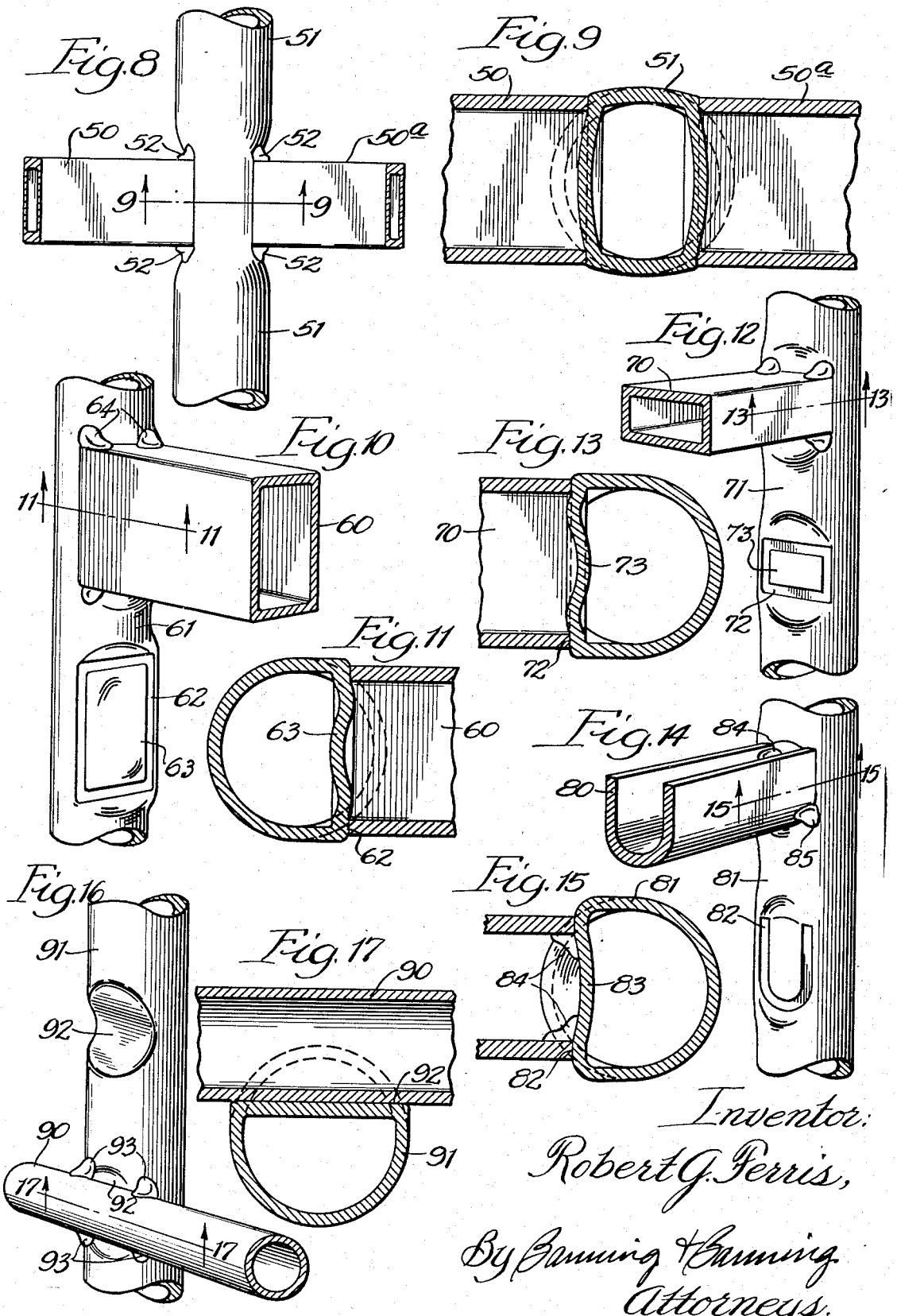

Patented Mar. 12, 1940

2,192,904

UNITED STATES PATENT OFFICE 2,192,904

METHOD OF MAKING PIPE CONNECTIONS

Robert G. Ferris, Harvard, Ill., assignor to Starline Inc., Harvard, Ill., a corporation of Illinois Application March 29, 1938, Serial No. 198,729

6 Claims. (Cl. 29—148.2)

An object of this invention is to provide a method of joining an end of one iron pipe to another intermediate the ends of the latter particularly for use in cattle stalls, animal pens and the like.

These and other objects, as will hereinafter appear, are accomplished by this invention which is fully described in the following specification and shown in the accompanying drawings, in which—

Figure 1 is a partial perspective view of two pipes joined in accordance with my invention, both pipes being round and of equal diameter, the vertical pipe showing also the deformation for reception of the end of another horizontal pipe;

Fig. 2 is a partial enlarged view of a die and punch for deforming the pipe of Fig. 1;

Fig. 3 is a partial enlarged section on the line 3—3 of Fig. 1 showing the pipe deformed and showing the end of the second pipe assembled in position for welding;

Fig. 4 is a view similar to Fig. 1 wherein the first or horizontal pipe is of smaller diameter than the pipe to which it is welded;

Figs. 4ᵃ and 4ᵇ are side and end views respectively of a modified form of punch for producing a series of projections for projection welding;

Fig. 5 is a partial enlarged section on the line 5—5 of Fig. 4;

Fig. 6 is a view similar to Fig. 1 showing a square pipe secured to the round pipe intermediate the ends of the latter;

Fig. 7 is a partial enlarged view on the line 7—7 of Fig. 6;

Fig. 8 is a partial front elevation of a round pipe having two square or rectangular pipes secured thereto at the two opposite sides of the vertical pipe and on the same level.

Fig. 9 is a partial enlarged section on the line 9—9 of Fig. 8;

Fig. 10 is a view similar to Fig. 6 but showing the second pipe rectangular instead of square, the long side of the rectangle being parallel with the axis of the vertical pipe to which it is secured;

Fig. 11 is a partial enlarged section on the line 11—11 of Fig. 10;

Fig. 12 is a view similar to Fig. 10 but showing a rectangular first pipe with the long side of the rectangle placed transversely to the axis of the second pipe to which it is secured;

Fig. 13 is a partial enlarged section on the line 13—13 of Fig. 12;

Fig. 14 is a view similar to Fig. 12 showing a U-shaped member secured to a vertical pipe intermediate its ends;

Fig. 15 is a partial enlarged view on the line 15—15 of Fig. 14;

Fig. 16 is a view similar to Fig. 14 showing a round pipe passing a vertical pipe and being partially embedded therein and welded thereto; and Fig. 17 is a partial enlarged view on the line 17—17 of Fig. 16.

The embodiment illustrated in Fig. 1 comprises a pipe 20 secured to a pipe 21 intermediate the ends of the latter. For convenience, the pipe 20 is called a first or horizontal pipe and the pipe 21 a second or vertical pipe.

To prepare the second pipe 21 for reception of the end of the first pipe 20, the pipe 21 is placed in a die 22 which has a transverse groove 23 therein which has a semi-cylindrical bottom of a size to just enclose the lower portion of the pipe 21. Above this groove is located a punch 24 suitably operated and having a flat annular bottom 25 and a depressed central portion 26. The annular bottom 25 is of the same shape as the end of the pipe 20 but is slightly larger than said end so as to impress an anular deformation 27 in the pipe 21 adapted to form a uniform bearing for the end of the pipe 20.

The sides of the die 22 are made just high enough to be even with the bottom of the punch when at the bottom of its stroke as shown in dotted lines in Fig. 2 so that the metal of the pipe 21 is forced out against the sides of the die as there shown thereby preventing the pipe from spreading under the pressure of the punch. The portion 27ᵃ of the pipe enclosed within the deformation 27 is sprung outwardly as shown in Fig. 3. This portion will take different shapes according to the shapes and sizes of different punches as will later be seen.

With the pipe 20 held squarely in place on the deformation 27, the two pipes are firmly secured together by arc-welding as at 28, thereby forming a connection which is substantially as strong as the pipes themselves.

The pipe 21 may serve as a header for a series of parallel pipes 20. In that case the center of the deformation 27ᵃ may be drilled to form a hole 27ᵇ to provide comunication between the header and pipes. In such a construction, the weld 28 completely encircles the pipe 20 thereby forming a gas-tight joint.

In Figs. 4 and 5 is shown a connection in which a horizontal pipe 30 is smaller than a vertical pipe 31 and the punch raises an annular ridge 32. The punch 30ᵃ (see Figs. 4ᵃ and 4ᵇ) has at its end alternate projections 30ᵇ and depressions 30ᶜ which when pressed into the pipe 31 produce alternate projections 31c, preferably four in number, and depressions 31b. When the squared or transversely cut end of the pipe 30 is pressed into engagement with these projections and a heavy welding current of electricity passed therebetween (by welding apparatus not shown) the projections become fused into the end of the pipe forming four welds 33. This process is known as projection welding.

In Figs. 6 and 7 is shown a form of connection in which a square pipe 40 is secured at its end to a round pipe 41, the pipe 40 being nearly as large as the pipe 41 as viewed in cross section (Fig. 7). A deformation 42 is provided in the vertical pipe 41, the punch (not shown) for causing this deformation being square and slightly larger than the squared end of the pipe 40. It will be observed that the central portion 43 of this deformation is substantially flat whereas the central portions of the deformation of the pipe of Fig. 3 is bowed outwardly. In this connection the draftsman has reproduced the actual bulges which took place in the pipes following the several deformations and this applies to all of the figures of the drawings shown herein except Fig. 5.

The squared end of the pipe 40 is held firmly against the deformation in the pipe 41 and while so held, the two are welded together by means of electric welds 44, preferably four in number. This construction lends itself quite well to animal pens and the like, and for this purpose I have shown a vertical rod 45 extending through an opening 46 in the bottom of the pipe 40. A similar horizontal pipe (not shown) would be secured to the pipe 41 at a point beneath the pipe 40, but would have holes provided in its upper surface so as to accommodate the lower end of the several rods 45 of which only one is shown. These rods are assembled in the horizontal pipes previous to welding the latter to the vertical pipe.

In Figs. 8 and 9 is shown still another modification of the invention in which two horizontal pipes 50, 50ª are secured to a vertical pipe 51, the latter being deformed on its two opposite sides to receive these pipes which, as here shown, are square or rectangular in cross section. The pipes 50, 50ª are secured to the vertical pipe as by means of electric welds 52.

Figs. 10 and 11 show a rectangular horizontal pipe 60 secured to a round vertical pipe 61 which has previously been acted upon by a punch having substantially the size and shape of the end of the pipe 60 to form a deformation 62 with a central depression 63. The pipe 60 whose end is adapted to bear against that deformation is secured in place by a series of gas or arc welds 64 or the like.

Figs. 12 and 13 are similar to Figs. 10 and 11 except that in Figs. 10 and 11 the horizontal pipe 60 which is rectangular in form is placed with the long axis of the rectangle parallel to the axis of a pipe 61 whereas in Figs. 12 and 13, a horizontal pipe 70 is rectangular in form with the long axis of the rectangle placed transversely to the axis of a vertical pipe 71 to which it is secured. The vertical pipe is deformed by means of a punch as previously described at 72. It will be observed that within the deformation 72 is a central portion 73 which takes a peculiar reverse bend. A similar bend 63 is shown in Fig. 11.

In Figs. 14 and 15 a horizontal U-shaped section 80 is secured to a vertical pipe 81. Here again a deformation 82 is formed in the vertical pipe by means of a die and punch, not shown, but similar to those previously described. Here again the punch is substantially the shape of the squared end of the section 80 but is slightly larger in its periphery. In this case, it will be observed in Fig. 15 that the central portion 83 within the deformation 82 is pressed inwardly. After holding the section 80 in alignment with the deformation in the vertical pipe 81, it is secured thereto at 84 and 85 by suitable welds.

In Figs. 16 and 17 is shown still another modification of the invention in which a horizontal pipe 90 lies across a vertical pipe 91, the latter being provided with a deformation 92 which is formed by a punch having the shape of the pipe 90. The pipe 90 will thus accurately fit the bottom of the deformation 92 and the two pipes can be firmly secured by means of suitable welds 93 which are here shown as four in number.

In all instances the vertical pipe is held by a suitable die, not shown, while a punch acts on the pipe to produce the desired deformation. This is true also of the vertical pipe (Figs. 8 and 9) wherein punches act from two opposite sides on the pipe to produce two deformations therein simultaneously.

It will be observed that this method of joining a pipe to a horizontal member is capable of many more modifications owing to the fact that numerous other horizontal members of different shapes, not shown, may thus be secured intermediate the length of a pipe which is deformed by means of a punch having substantially the cross section of the horizontal member which it is desired to attach to this pipe. Communicating openings like 27b of Fig. 1 may be used in many of these connections so that fluids of various kinds may be permitted to pass from one to the other. Where the connection is to be watertight or gas-tight, a continuous weld may be employed between the two pipes so joined.

The projection welds of Figs. 4 and 5 may be applied to any of the other modifications shown by using suitable punches for forming the surface of the vertical pipe to form projections to which the horizontal pipes may be welded by the projection welding process.

While I have shown and described several modifications of my invention, it is to be understood that it is capable of many modifications. Changes, therefore, may be made in the construction and arrangement without departing from the spirit and scope of the invention as disclosed in the appended claims.

I claim:

1. The method of joining two pipes comprising supporting a pipe intermediate its ends in a die which substantially fits its exterior surface, deforming the pipe opposite the point supported by the die by a punch which has substantially the shape of the end of the pipe to be joined to the first-mentioned pipe, the center of the punch being relieved, and assembling and welding the two pipes in assembled relation at the point of deformation.

2. The method of joining a squared end of a first pipe at right angles to a second pipe intermediate the ends of the latter comprising holding the opposite side of the latter pipe, deforming the latter pipe at the point of juncture to engage the squared end of the first pipe at not less than three points, and assembling and welding the pipes at the juncture.

3. The method of joining a squared end of a first pipe at right angles to a second pipe intermediate the ends of the latter comprising holding the opposite side of the latter pipe, deforming the latter pipe at the point of juncture to form a number of spaced projections to engage the squared end of the first pipe at not less than three points, and assembling and welding the squared end of the first pipe to at least three of the projections on the latter pipe.

4. The method of joining two pipes comprising supporting a pipe intermediate its ends in a die which substantially fits its exterior surface, deforming the pipe opposite the point supported by the die by a punch which has substantially the shape of the portion of the pipe to be joined to the first-mentioned pipe, and assembling and welding the two pipes in assembled relation at the point of deformation.

5. The method of joining two pipes comprising supporting a pipe intermediate its ends in a die which substantially fits its exterior surface, deforming the pipe opposite the point supported by the die by a punch which has substantially the shape of the end of the pipe to be joined to the first-mentioned pipe, the center of the punch being relieved, and assembling and welding the two pipes in assembled relation at right angles to each other at the point of deformation.

6. The method of joining two pipes of nearly the same transverse dimensions comprising supporting a pipe intermediate its ends in a die which substantially fits its exterior surface, deforming the pipe opposite the point supported by the die by a punch which has substantially the shape of the end of the pipe to be joined to the first-mentioned pipe, the sides of the die serving to limit the amount the pipe can spread under the action of the punch, and assembling and welding the two pipes in assembled relation at the point of deformation.

ROBERT G. FERRIS.